United States Patent
Winn

(10) Patent No.: US 6,782,834 B2
(45) Date of Patent: Aug. 31, 2004

(54) LAWN SEED AND CHEMICAL DISPENSER WITH SUB-SOIL ROCK DETECTOR

(76) Inventor: Les R. Winn, 1370 Brawley Cir., Atlanta, GA (US) 30319

(*) Notice: Subject to any disclaimer, the term of this patent is extended or adjusted under 35 U.S.C. 154(b) by 176 days.

(21) Appl. No.: 10/261,562

(22) Filed: Sep. 30, 2002

(65) Prior Publication Data

US 2004/0060948 A1 Apr. 1, 2004

(51) Int. Cl.⁷ .................................. A01C 5/02
(52) U.S. Cl. .................. 111/92; 222/286; 222/266
(58) Field of Search ............... 111/92, 95, 96, 111/97, 93, 94; 222/266, 286, 287, 191, 457.5, 460, 267, 465.1; 221/151, 185, 281, 292, 293, 306

(56) References Cited

U.S. PATENT DOCUMENTS

| | | | | |
|---|---|---|---|---|
| 11,642 A | * | 9/1854 | Daser | 111/96 |
| 70,747 A | * | 11/1867 | Russell et al. | 111/96 |
| 3,014,443 A | * | 12/1961 | Keyser et al. | 111/92 |
| 3,122,110 A | * | 2/1964 | Wernicke | 111/106 |
| 3,771,474 A | * | 11/1973 | Elston | 111/96 |
| 3,799,081 A | * | 3/1974 | Wilson | 111/130 |
| 3,815,526 A | * | 6/1974 | Christopherson | 111/7.2 |
| 3,903,815 A | * | 9/1975 | Winkler | 111/92 |
| 4,084,726 A | * | 4/1978 | Nicol | 221/266 |
| 4,244,308 A | * | 1/1981 | Vince | 111/89 |
| 4,614,160 A | * | 9/1986 | Curlett | 111/96 |
| 4,760,807 A | * | 8/1988 | Keller | 111/92 |
| 5,461,992 A | * | 10/1995 | Scollard | 111/7.2 |

* cited by examiner

*Primary Examiner*—Victor Batson
(74) *Attorney, Agent, or Firm*—Harry I. Leon

(57) ABSTRACT

A hand-held tool for not only placing granular materials such as grass seed, granular chemicals, or a combination thereof into soil but also aerating it and detecting near surface rocks and the like. The tool includes a hopper, a shaft which terminates in a soil-piercing spike, and a spring-actuated sleeve slideably mounted on the shaft. The shaft defines a partially hollow bore and an orifice, the orifice being disposed on a sidewall of the shaft distal from the hopper and proximate with the juncture between the shaft and the spike. The bore and the orifice fluidly communicate with each other and with the hopper. The spring-actuated sleeve normally blocks the orifice, so that seed and/or chemicals cannot spill out of it. Granular materials are dispensed by dropping them by gravity out of the orifice whenever the spike can be driven into the soil far enough. A ground-engaging flange on the spring-actuated sleeve must be thrust upwardly along the shaft, simultaneously as the spike penetrates the earth, to uncover the orifice.

3 Claims, 3 Drawing Sheets

LAWN SEED AND CHEMICAL DISPENSER WITH SUB-SOIL ROCK DETECTOR

FIELD OF THE INVENTION

The present invention relates generally to manually-operated devices for dispensing granular materials beneath the soil and more particularly to a hand-held dispenser which creates a small soil cavity at each location targeted for receiving lawn seed, fertilizer pellets or the like.

BACKGROUND OF THE INVENTION

A common problem faced by gardeners is getting grass to grow in certain trouble spots in established lawns. Often the source of the problem can be traced to one or more of the following plant growth impediments: inadequate soil nutrients, high soil acidity, compacted soil, soil infected with plant-eating insects or disease organisms, and foreign objects situated just below the ground surface.

Prior art remedies include over-seeding the established lawn, a practice which entails simply throwing by hand or device large amounts of grass seed in places with little or no grass growth. Another approach involves using a tool to scratch the earth where grass is desired and then sowing grass seed across the scratched area.

Hand-held devices for placing the seed directly beneath the surface of the soil include a seed planter recently patented by Mitchell and Mitchell. As disclosed in U.S. Pat. No. 6,279,496, which issued Aug. 28, 2001, the Mitchells' seed planter comprises an elongated funnel secured to one side of a cane-like member. The technique for using this seed planter is laborious: seed must be dropped manually through the elongated funnel.

Other hand-held prior art devices for spilling seeds on the ground or discharging seeds and/or granulated chemicals below its surface are complicated to construct and to use. A good example of these devices is the seed planter taught by Yeager and Shaner in U.S. Pat. No. 4,165,697. The latter seed planter utilizes a complex mechanism in which jaws open, creating a seed opening in the soil when a slideable soil collar, which normally surrounds the jaws, is retracted. Simultaneously, a scoop recess, carrying a single seed, is brought into alignment with an opening through which the seed can fall downwardly, en route from the hopper to the newly-created seed opening.

Moreover, the cited prior art devices fail to provide for the detection of a basic impediment to lawn maintenance, i.e., sub-soil rocks and the like. If grass is to survive drouth, it must have the freedom to establish its roots to a depth of at least five inches. Unless the gardener can detect and remove any buried foreign object(s) situated less than five inches below the surface prior to sowing or planting grass seed in an affected trouble spot, his attempts to grow grass there will all be in vain.

SUMMARY OF THE INVENTION

An object of the present invention is to provide a tool which can be used not only to plant grass seed and dispense granulated chemicals but also, during this planting/dispensing process, to aerate compacted soil and to detect the presence of near surface buried objects, thereby facilitating a gardener's efforts to overcome a wide range of chemical and physical impediments to the growth of grass in an established lawn.

A further object of the present invention is to provide a hand-held device which, whenever it is used to dispense granular materials below the surface of the ground, also aerates the soil.

A still further object of the present invention is to provide such a hand-held device which dispenses granular materials only when the near surface soil, to a predetermined depth, is free of sizeable rocks and the like.

In accordance with the present invention, there is provided an improved dispenser which includes an elongated shaft, a hopper, and a spring-actuated sleeve to which is affixed a ground-engaging flange. The shaft is rigidly joined to the hopper and defines both a hollow bore and an orifice.

The hollow bore, which begins at an open end of the shaft near its juncture with the hopper, extends longitudinally nearly the entire length of the shaft. Distal from the hopper, the hollow bore terminates in a closed wall. Extending longitudinally from the closed end of the shaft is a soil-piercing spike which is rigidly attached thereto.

The orifice, which is disposed in a sidewall of the shaft proximate with its closed end, fluidly communicates, via the hollow bore, with the hopper. Granular materials stored in the hopper tend to flow out of it, via the bore, and then exit through the orifice whenever the dispenser is held in an upright position and the orifice, normally blocked by the spring-actuated sleeve, is uncovered.

Slideably mounted on the shaft, the spring-actuated sleeve is biased away from the hopper by a helical spring. The ground-engaging flange comprises means for partially overcoming the bias of this spring.

Held between the shaft and a cylindrically shaped collar rigidly attached to the shaft near its juncture with the hopper, the helical spring is compressed between one end of the collar and an annular ring which is affixed to the sleeve. The action of the spring tends to push the annular ring, which extends outwardly from the sleeve and is slideably movable within the collar, against a shoulder disposed within the collar, so as to normally maintain the sleeve in a fully extended position. Moreover, the respective extensions of the shaft and of the sleeve, when the latter is fully extended relative to its coupling with the collar, are such that a portion of the sleeve covers the orifice, blocking it.

In use, granular materials are dropped by gravity out of the orifice whenever the spike can be driven into the soil far enough that the ground-engaging flange is simultaneously thrust against its surface. On the other hand, when the spike encounters a sizeable rock or other buried foreign object, the flange will fail to make contact with the earth, thereby blocking discharge of granular materials from the orifice. The length of the spike determines the depth of the hole created when the spike is driven into the soil, as well as the sub-soil zone in which the improved dispenser can be used to detect buried foreign objects.

Once the dispenser is removed from the soil, the spring-actuated sleeve automatically covers the orifice, thereby preventing seeds and/or granulated chemicals from spilling out while the dispenser is not in service.

DESCRIPTION OF THE PREFERRED EMBODIMENT

Figure 1:
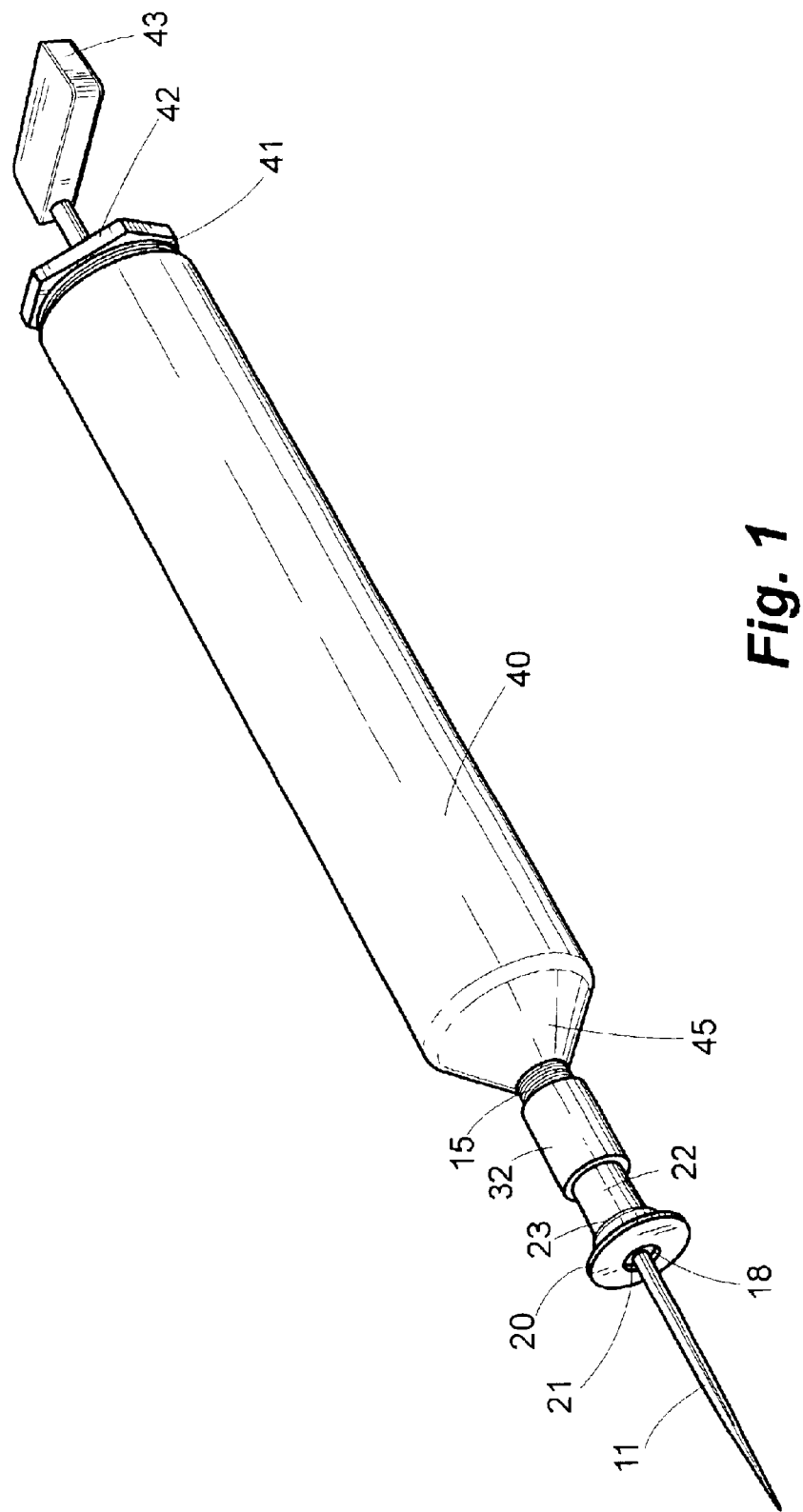
FIG. 1 is a perspective view of the dispenser according to the present invention, the dispenser having a spring-actuated sleeve which is shown in its fully extended position.
Figure 3:
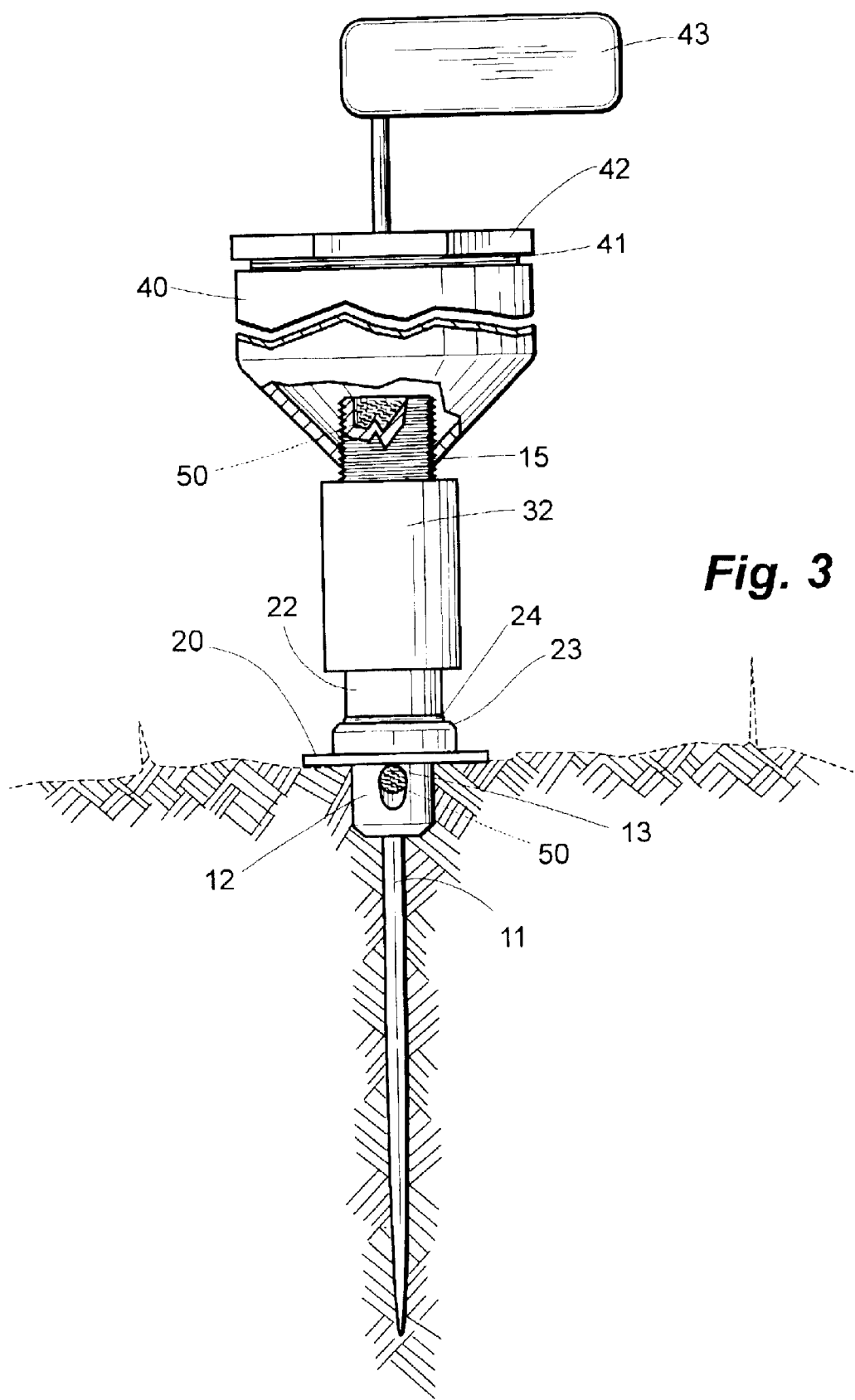
FIG. 3 is a fragmentary elevational view of the dispenser according to FIG. 1, showing the spring-actuated sleeve in a retracted position, exposing the orifice and lawn seed posed within the passageway, ready to spill out of the orifice.

In the drawings, a dispenser according to the present invention includes a soil-piercing shaft 12 and a spring-actuated sleeve 22 slideably mounted thereon. Distal ends of the shaft 12 are rigidly attached to a spike 11 and to an elongated hopper 40, respectively. Atop the hopper 40, a cap 42, with a pistol-grip 43 mounted thereon, is threadedly engageable with the hopper (FIGS. 1 and 3). Unscrewing threads 41, one can remove the cap 42 and fill the hopper with granular materials 50.

Figure 2:
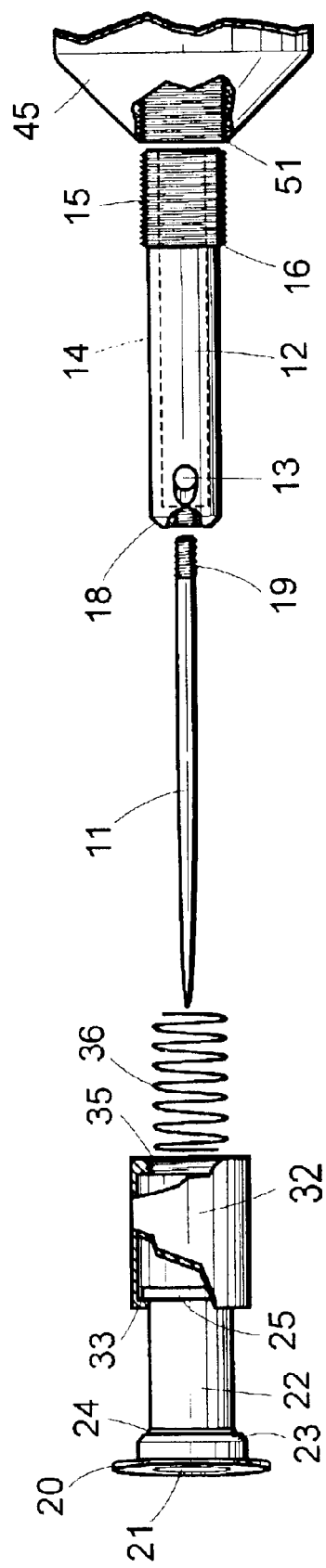
FIG. 2 is an exploded view of the dispenser according to FIG. 1, only fragmentary portions of a hopper and of a collar in the disassembled dispenser being shown for clarity of illustration, a passageway disposed within a soil-piercing shaft through which granular materials (not shown) can flow from the hopper to an orifice disposed near one end of the shaft being indicated in dashed lines.

In the preferred embodiment, the shaft 11 terminates upwardly in an externally threaded section 15, which, in the assembled dispenser, engages an internally threaded section 51 formed in the lower end of the hopper 40 (FIGS. 2 and 3). Likewise, the spike 11 terminates in a threaded segment 19 engageable with a threaded portion of a closed wall 18 at the lower end of the shaft 12 (FIG. 2).

In addition, the shaft 12 defines both a hollow bore 14 and an orifice 13. The bore 14 extends from the juncture of the shaft 12 with the hopper 40, nearly the entire length of the shaft (FIG. 2). The orifice 13, which is disposed in a sidewall of the shaft 12 proximate with its closed end 18, fluidly communicates, via the bore 14, with the hopper 40. Except for the fact that the orifice 12 is normally blocked by the spring-actuated sleeve 22, granular materials 50 would tend to flow from hopper cone 45 into the bore 14 and thence into the orifice 13 whenever the dispenser were being held in an upright position.

Means for biasing the spring-actuated sleeve 22 away from the hopper 40 comprises a helical spring 36 (FIG. 2). Held radially between the shaft 12 and a collar 32 which is rigidly attached to the threaded section 15, the spring 36 is compressed longitudinally between a ridge 16 and an annular ring 25 (FIG. 2).

As is illustrated in FIG. 2, the ring 25 is affixed to the upper end of the sleeve 22; and the ridge 16 is defined by the lowermost threads of section 15. In the assembled dispenser, threads 35 defined by the collar 32 engage a lower portion of the threaded section 15. The strength of the spring 36 can be increased by advancing the ridge 16 further into the collar 32.

In order to hold the sleeve 22 in a fully extended position relative to the collar 32, the helical spring 36 must have sufficient strength to push the annular ring 25, which extends outwardly from the sleeve 22 and is slideably movable within the collar 32, against a shoulder 33 disposed within the collar (FIG. 2). When the sleeve 22 is fully extended, a portion of the sleeve covers the orifice 13, blocking it (FIG. 1).

Distal from the collar 22, a ground-engaging flange 20 supported by a base 23 and spacer 24 is rigidly attached to the sleeve 22. As the spike 11 is driven into soft, lightly moistened earth and the ground-engaging flange 20 is thrust thereagainst, the lower end 18 of the shaft 12 passes through an opening 21 defined by the flange (FIGS. 1 and 3). Simultaneously, the sleeve 22 retreats upwardly along the shaft, exposing the orifice 13.

In use, granular materials 50 are dropped by gravity out of the orifice 13 whenever the spike 11 can be driven into the soil far enough that the ground-engaging flange 20 is also thrust against the ground. Moreover, each time the spike 11 penetrates the soil, it aerates—a process which is highly beneficial for producing healthy plant growth.

On the other hand, when the spike 11 strikes a sizeable rock or other buried foreign object, the sleeve 22 will not retreat upwardly. Rather, under such circumstances, the flange 20 fails to make contact with the ground. As a result, wasteful discharge of granular materials 50 in an area where the rock or other object(s) need to be removed is prevented. Moreover, the shaft 11, which is preferably fabricated of stainless steel, emits an audible sound and sends a vibration to the tool operator's hand, signalling the exact location of the rock as the shaft strikes it.

The length of the spike 11 determines the depth of the hole created when the spike is driven into the soil, as well as the depth of the near surface zone in which the improved dispenser can be used to detect buried foreign objects.

Once the dispenser is removed from the soil, the spring-actuated sleeve 22 automatically covers the orifice 13, thereby preventing seeds and/or granulated chemicals from spilling out while the dispenser is not in service.

In an alternate embodiment, the elongated hopper includes a funnel top to facilitate loading granular materials, such as mixtures of grass seed, fertilizer pellets and the like.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

What is claimed is:

1. A hand-held tool for dispensing granular materials into soil and detecting hard objects buried just below ground surface, which comprises:
   (a) a hopper;
   (b) a ground-engaging flange;
   (c) an elongated shaft, the shaft being rigidly attached to the hopper and defining both a hollow bore and an orifice; the shaft having a cylindrical sidewall and a closed wall disposed perpendicularly to the sidewall, the hollow bore extending longitudinally from the hopper to the closed wall; the orifice, which is disposed in the sidewall proximate with the closed end, fluidly communicating, via the hollow bore, with the hopper;
   (d) a soil-piercing spike which is rigidly attached to the closed wall and extends longitudinally from the shaft;
   (e) a spring-actuated sleeve, the sleeve being slideably mounted on the shaft and spring biased away from the hopper, the spring-actuated sleeve normally blocking flow of any granular materials stored within the bore from the orifice; and
   (f) means, including the ground-engaging flange which is rigidly mounted on the sleeve, for partially overcoming the bias of the spring, so that granular materials stored within the bore flow by gravity out of the orifice whenever the spike is driven into the soil far enough that the flange is simultaneously thrust against the ground.

2. The hand-held tool according to claim 1, wherein the soil-piercing spike threadedly engages the closed wall, so that the spike can be easily replaced, allowing soil openings of varying depths to be created for receiving granular materials flowing out of the orifice.

3. The hand-held tool according to claim 1, wherein the soil-piercing spike is fabricated of a metal which causes the spike to emit a sound and vibrate whenever the spike suddenly strikes a hard object buried just below the ground surface.

* * * * *